United States Patent Office

2,819,212
Patented Jan. 7, 1958

2,819,212

PROCESS FOR BREAKING PETROLEUM EMULSIONS EMPLOYING CERTAIN POLYEPOXIDE MODIFIED OXYALKYLATION DERIVATIVES, SAID DERIVATIVES OBTAINED IN TURN BY OXYALKYLATION OF PHENOL-ALDEHYDE RESINS

Melvin De Groote, University City, and Kwan-Ting Shen, Brentwood, Mo., assignors to Petrolite Corporation, Wilmington, Del., a corporation of Delaware No Drawing. Application November 19, 1953
Serial No. 393,221

24 Claims. (Cl. 252—331)

The present application is a continuation-in-part of our co-pending application, Serial No. 343,804, filed March 20, 1953, now abandoned. Said aforementioned co-pending application is concerned with processes for breaking petroleum emulsions of the water-in-oil type employing a demulsifier including the reaction products of (A) certain oxyalkylated phenol-aldehyde resins, therein described in detail, and (B) certain phenolic polyepoxides and cogenerically associated compounds formed in their preparation, also therein described in detail, the ratio of reactant (A) to reactant (B) being in the proportion of two moles of (A) to one mole of (B).

The present invention relates to processes for breaking petroleum emulsions of the water-in-oil type employing a demulsifier including the reaction products of the above described reactants, (A) and (B), which are hereinafter described in detail, the ratio of reactant (A) to reactant (B), however, being in the proportion of four moles of (A) to three moles of (B).

The present application thus differs from the aforementioned application in that one obtains products having at least twice the molecular weight by the use of a molal ratio of 4 moles of (A) to 3 moles of (B). Specifically, the product described in aforementioned co-pending application may be indicated thus:

A—B—A

In contradistinction the products herein described and useful for the resolution of petroleum emulsions may be indicated thus:

A—B—A—B—A—B—A

Products may be obtained by either a continuous process involving the two reactants or, if desired, by a two step method in which the final product described in aforementioned co-pending application becomes an intermediate and is in ratio of two moles of intermediate to one mole of (B), thus:

2(A—B—A)+B→A—B—A—B—A—B—A

In our co-pending application, Serial No. 393,222, filed November 19, 1953, now Patent No. 2,792,355, dated May 14, 1957, reference is made to another product in which two different polyepoxides are employed; in other words, if the one described above is referred to as (B) and is essentially hydrophobe in character, then in comparison our aforementioned copending application, Serial No. 393,222, is concerned with a combination obtained by a stepwise process comparable to the one last mentioned above in which final addition of (B) is replaced by the addition of a hydrophile polyepoxide and thus is illustrated in the following manner:

2(A—B—A)+C→A—B—A—C—A—B—A

For an obvious reason, to wit, ease of comparison with both of the aforementioned applications, Serial No. 343,804 and Serial No. 393,222, we are describing the 2-step process of manufacture although obviously the two steps could be fused or combined to be a single step, provided the same polyepoxide or the same type of polyepoxide, for instance, an essentially hydrophobe polyepoxide, is used. The single step procedure is illustrated subsequently.

Notwithstanding the fact that subsequent data will be presented in considerable detail, yet the description becomes somewhat involved and certain facts should be kept in mind. Th polyepoxides, and particularly the diepoxides may have no connecting bridge between the phenolic nuclei as in the case of a diphenyl derivative, or may have a variety of connecting bridges, i. e., divalent linking radicals. Our preference is that either diphenyl compounds be employed or else compounds where the divalent link is obtained by the removal of a carbonyl oxygen atom as derived from a ketone or aldehyde.

If it were not for the expense involved in preparing and purifying the monomer we would prefer it to any other form, i. e., in preference to the polymer or mixture of polymer and monomer.

Stated another way we would prefer to use materials of the kind described, for example, in U. S. Patent 2,530,353, dated November 14, 1950. Said patent describes compounds having the general formula

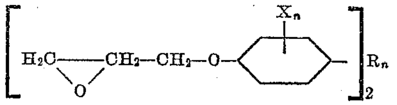

wherein R is an aliphatic hydrocarbon bridge, each $n$ independently has one of the values 0 and 1, and X is an alkyl radical containing from 1 to 4 carbon atoms.

The compounds having two oxirane rings and employed for combination with the oxyalkylated phenol aldehyde resin are characterized by the following formula and cogenerically associated compounds formed in their preparation:

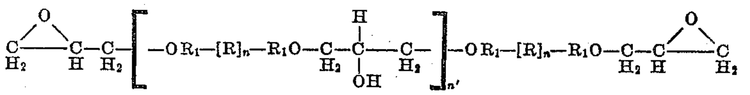

in which R represents a divalent radical selected from the class of ketone residues formed by the elimination of the ketonic oxygen atom and aldehyde residues obtained by the elimination of the aldehydic oxygen atom, the divalent radical

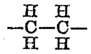

the divalent

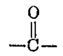

radical, the divalent sulfone radical, and the divalent monosulfide radical —S—, the divalent radical —$CH_2SCH_2$—, and the divalent disulfide radical —S—S—; and $R_1O$ is the divalent radical obtained by the elimination of a hydroxyl hydrogen atom and a nuclear hydrogen atom from the phenol

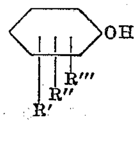

in which R′, R″, and R‴ represent hydrogen and hydrocarbon substituents of the aromatic nucleus, said substituent member having not over 18 carbon atoms; $n$ represents an integer including zero and 1, and $n'$ represents a whole number not greater than 3. The above mentioned compounds and those cogenerically associated compounds formed in their preparation are thermoplastic and organic solvent soluble. Reference to being thermoplastic characterizes products as being liquids at ordinary temperature or readily convertible to liquids by merely heating below the point of pyrolysis and thus differentiates them from infusible resins. Reference to being soluble in an organic solvent means any of the usual organic solvents, such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with amine. In such instances, of course, the solvent selected would have to be one which is not susceptible to oxyalkylation, as, for example, kerosene, benzene, toluene, dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter, the word "epoxy," unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of a strictly formal nomenclature as in the example of the simplest diepoxide which contains at least 4 carbon atoms and is formally described as 1,2-epoxy-3,4-epoxybutane (1,2-3,4-diepoxybutane).

It well may be that even though the previously suggested formula represents the principal component, or components, of the result or reaction product described in the previous text, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed towards products which are not resins and have certain solubility characteristics not inherent in resins. Note, for example, that said U. S. Patent No. 2,494,295 describes products wherein the epoxide derivative can combine with a sulfonamide resin. The intention in said U. S. Patent 2,494,295, of course, is to obtain ultimately a suitable resinous product having the characteristics of a comparatively insoluble resin. The intent in the present instance in a comparable example would be to use a sulfonamide (not a sulfonamide resin) and obtain a material which does not have the characteristics of an ordinary varnish resin or the like, i. e., is permanently soluble, and stays soluble generally as a liquid of ordinary viscosity, or as a thick viscous liquid and may be a thermoplastic solid, and additionally even may be water-soluble.

Having obtained a reactant having generally 2 epoxy rings as depicted in the last formula preceding, or low molal polymers thereof, it becomes obvious the reaction can take place with any one of a number of oxyalkylated resins which are still oxyalkylation-susceptible. There is available considerable literature, particularly patent literature dealing with oxyalkylated resins of the kind herein employed for reaction with the selected polyepoxides. These will be referred to in greater detail subsequently. For purpose of convenience, reference is simply made at the moment to the following patents: U. S. Patent Nos. 2,499,365; 2,499,366; 2,499,367; 2,499,368; and 2,499,370, all dated March 7, 1950, to De Groote and Keiser.

To illustrate the products useful in the process of the present invention reference will be made to a reaction involving a mole of the oxyalkylating agent, i. e., the compound having two oxirane rings and oxyalkylated resins as described. Proceeding with the example previously described it is obvious the reaction ratio of two moles of the oxyalkylated resin to one mole of the diepoxide gives a product which may be indicated as follows:

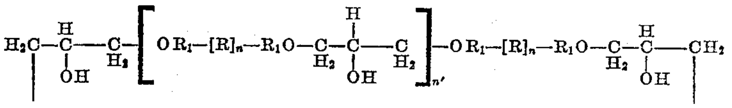

(oxyalkylated resin)          (oxyalkylated resin)

in which the various characters have their prior significance. However, molal ratios may be varied as noted subsequently.

Such products must be soluble in suitable solvents such as a non-oxygenated hydrocarbon solvent or an oxygenated hydrocarbon solvent or, for that matter, a mixture of the same with water. Needless to say, after the resin has been treated with a large amount of ethylene oxide the products are water soluble and may be soluble in an acid solution.

The purpose in this instance is to differentiate from insoluble resinous materials, particularly those resulting from relation or cross-linking. Not only does this property serve to differentiate from instances where an insoluble material is desired, but also serves to emphasize the fact that in many instances the preferred compounds have distinct water-solubility or at least distinct dispersibility in water. For instance, the products freed from any solvent can be shaken with five to twenty times their weight of distilled water at ordinary temperature and are at least self-dispersing, and in many instances water-soluble, in fact colloidally soluble.

Basic nitrogen atoms can be introduced into such derivatives by use of a reactant having both a nitrogen group and a 1,2-epoxy group, such as 3-dialkylaminoepoxypropane. See U. S. Patent No. 2,520,093, dated August 22, 1950, to Gross.

As far as the use of the herein described products goes for the purpose of resolving petroleum emulsions of the water-in-oil type, we prefer to employ oxyalkylated derivatives, which are obtained by the use of monoepoxides, in such manner that the derivatives so obtained have sufficient hydrophile character to meet at least the test set forth in U. S. Patent No. 2,499,368, dated March 7, 1950, to De Groote et al. In said patent such test for emulsification using a water-insoluble solvent, generally xylene, is described as an index of surface activity.

In the present instance the various oxyalkylated derivatives obtained particularly by use of ethylene oxide, propylene oxide, etc., may not necessarily be xylene-soluble although they are xylene-soluble in a large number of instances. If such compounds are not xylene-soluble the obvious chemical equivalent, or equivalent chemical test, can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test obviously is the same for the reason that there will be two phases on vigorous shaking and surface activity makes its presence manifest. It is understood the reference in the hereto appended claims as to the use of xylene in the emulsification test includes such obvious variant.

Reference is made again to U. S. Patent No. 2,499,368, dated March 7, 1950, to De Groote and Keiser. Attention is directed to that part of the text which appears in columns 28 and 29, lines 12 through 75, and lines 1 through 21, respectively. Reference is made to this text with the same force and effect as if it were herein included. This, in essence, means that the preferred product for resolution of petroleum emulsions of the water-in-oil type is characterized by the fact that a 50–50 solution in xylene, or its equivalent, when mixed with one to three volumes of water and shaken, will produce an emulsion.

For purpose of convenience what is said hereinafter will be divided into seven parts with Part 3, in turn, being divided into three subdivisions, and Part 6, in turn, being divided into two subdivisions.

Part 1 is concerned with our preference in regard to the polyepoxide and particularly the diepoxide reactant;

Part 2 is concerned with certain theoretical aspects of diepoxide preparation;

Part 3, Subdivision A, is concerned with the preparation of monomeric diepoxides, including Table I;

Part 3, Subdivision B, is concerned with the preparation of low molal polymeric epoxides or mixtures containing low molal polymeric epoxides as well as the monomer and includes Table II;

Part 3, Subdivision C, is concerned with miscellaneous phenolic reactants suitable for diepoxide preparation;

Part 4 is concerned with suitable phenol-aldehyde resins to be employed for reaction with the epoxides;

Part 5 is concerned with the oxyalkylation of the previously described phenol-aldehyde resins;

Part 6, Subdivision A, is concerned with the 2-step procedure involving reaction between the two preceding types of materials and examples obtained by such reactions. It involves in essence, preparation of an intermediate by reaction between 2 moles of the oxyalkylated phenol-aldehyde resin and one mole of the digylcidyl ether, for example (identical with the products described in aforementioned co-pending application, Serial No. 343,804), followed by a second step in which 2 moles of these larger molecules are combined with use of a single mole of a diglycidyl ether or the like;

Part 6, Subdivision B is a single step procedure resulting in substantially the same compounds by the use of 4 moles of the oxyalkylated phenol-aldehyde resin and 3 moles of the diglycidyl ether, or the equivalent;

Part 7 is concerned with the resolution of petroleum emulsions of the water-in-oil type by means of the previously described chemical compounds or reaction products.

PART 1

As will be pointed out subsequently, the preparation of polyepoxides may include the formation of a small amount of material having more than two epoxide groups per molecule. If such compounds are formed they are perfectly suitable except to the extent they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a co-generic mixture as explained subsequently. Preparation of the monomer or separation of the monomer from the remaining mass of the co-generic mixture is usually expensive. If monomers were available commercially at a low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus, we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monomers and still be satisfactory. Briefly, then, our preference is to use the monomer or the monomer with the minimum amount of higher polymers.

It has been pointed out previously that the phenolic nuclei in the epoxide reactant may be directly united, or united through a variety of divalent radicals. Actually, it is our preference to use those which are commercially available and for most practical purposes it means instances where the phenolic nuclei are either united directly without any intervening linking radical, or else united by a ketone residue or formaldehyde residue. The commercial bis-phenols available now in the open market illustrate one class. The diphenyl derivatives illlustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for this compound is

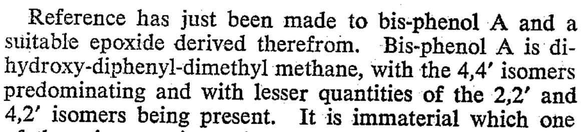

Reference has just been made to bis-phenol A and a suitable epoxide derived therefrom. Bis-phenol A is dihydroxy-diphenyl-dimethyl methane, with the 4,4′ isomers predominating and with lesser quantities of the 2,2′ and 4,2′ isomers being present. It is immaterial which one of these isomers is used and the commercially available mixture is entirely satisfactory.

Attention is again directed to the fact that in the instant part, to wit, Part 1, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 2

The polyepoxides and particularly the diepoxides can be derived by more than one method as, for example, the use of epichlorohydrin or glycerol dichlorohydrin. If a product such as bis-phenol A is employed the ultimate compound in monomeric form employed as a reactant in the present invention has the following structure:

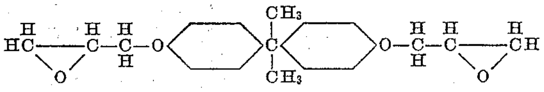

Treatment with epichlorohydrin, for example, does not yield this product initially but there is an intermediate produced which can be indicated by the following structure:

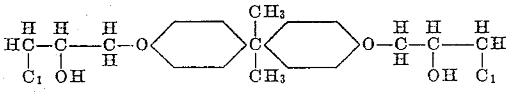

Treatment with alkali, of course, forms the epoxy ring. A number of problems are involved in attempting to produce this compound free from cogeneric materials of related composition. The difficulty stems from a number of sources and a few of the more important ones are as follows:

(1) The closing of the epoxy ring involves the use of caustic soda or the like which, in turn, is an effective catalyst in causing the ring to open in an oxyalkylation reaction.

Actually, what may happen for any one of a number of reasons is that one obtains a product in which there is only one epoxide ring and there may, as a matter of fact, be more than one hydroxyl radical as illustrated by the following compounds:

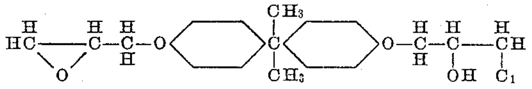

or

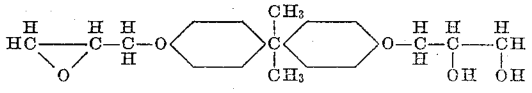

(2) Even if one starts with the reactants in the preferred ratio, to wit, two parts of epichlorohydrin to one part of bisphenol A, they do not necessarily so react and as a result one may obtain products in which more than two epichlorohydrin residues become attached to a single bis-phenol A nucleus by virtue of the reactive hydroxyls present which enter into oxyalkylation reactions rather than ring closure reactions.

(3) As is well known, ethylene oxide in the presence of alkali, and for that matter in the complete absence of water, forms cyclic polymers. Indeed, ethylene oxide can produce a solid polymer. This same reaction can, and at times apparently does, take place in connection with compounds having one, or in the present instance, two substituted oxirane rings, i. e., substituted 1,2 epoxy rings. Thus, in many ways it is easier to produce a polymer, particularly a mixture of the monomer, dimer and trimer, than it is to produce the monomer alone.

(4) As has been pointed out previously, monoepoxides may be present and, indeed, are almost invariably and inevitably present when one attempts to produce polyepoxides, and particularly diepoxides. The reason is the one which has been indicated previously, together with the fact that in the ordinary course of reaction a diepoxide, such as

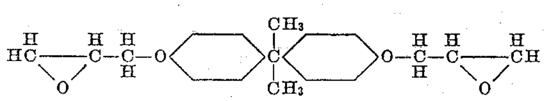

may react with a mole of bis-phenol A to give a monoepoxy structure. Indeed, in the subsequent text immediately following reference is made to the dimers, trimers and tetramers in which two epoxide groups are present. Needless to say, compounds can be formed which correspond in every respect except that one terminal epoxide group is absent and in its place is a group having one chlorine atom and one hydroxyl group, or else two hydroxyl groups, or an unreacted phenolic ring.

(5) Some reference has been made to the presence of a chlorine atom and although all effort is directed towards the elimination of any chlorine-containing molecule yet it is apparent that this is often an ideal approach rather than a practical possibility. Indeed, the same sort of reactants are sometimes employed to obtain products in which intentionally there is both an epoxide group and a chlorine atom present. See U. S. Patent No. 2,581,-464, dated January 8, 1952, to Zech.

What has been said in regard to the theoretical aspect is, of course, closely related to the actual method of preparation which is discussed in greater detail in Part 3, particularly subdivisions A and B. There can be no clear line between the theoretical aspect and actual preparative steps. However, in order to summarize or illustrate what has been said in Part 1, immediately preceding, reference will be made to a typical example which already has been employed for purpose of illustration. The particular example is

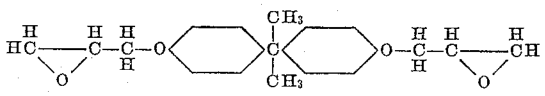

It is obvious that two moles of such material combine readily with one mole of bis-phenol A,

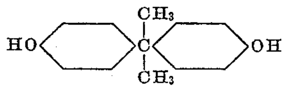

to produce the product which is one step further along, at least, towards polymerization. In other words, one prior example shows the reaction product obtained from one mole of the bisphenol A and two moles of epichlorohydrin. This product in turn would represent three moles of bisphenol A and four moles of epichlorohydrin.

For purpose of brevity, without going any further, the next formula is in essence one which, perhaps in an idealized way, establishes the composition of resinous products available under the name of Epon Resins as now sold in the open market. See, also, chemical pamphlet entitled "Epon Surface-Coating Resins," Shell Chemical Corporation, New York city. The word "Epon" is a registered trademark of the Shell Chemical Corporation.

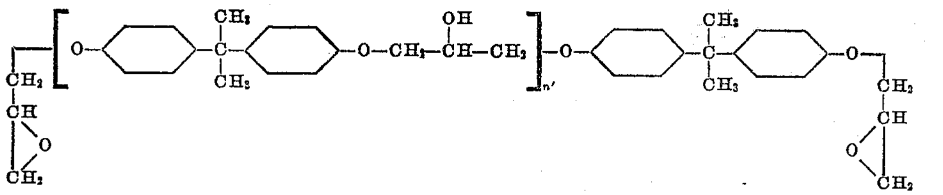

For the purpose of the instant invention, *n'* may represent a number including zero, and at the most a low number such as 1, 2 or 3. This limitation does not exist in actual efforts to obtain resins as differentiated from the herein described soluble materials. It is quite probable that in the resinous products as marketed for coating use the value of *n'* is usually substantially higher. Note again what has been said previously that any formula is, at best, an over-simplification, or at the most represents perhaps only the more important or principal constituent or constituents. These materials may vary from simple non-resinous to complex resinous epoxides At the expense of repetition of what appeared previously, it may be well to recall that these materials may vary from simple soluble non-resinous to complex non-soluble resinous epoxides which are polyether derivatives of polyhydric phenols containing an average of more than one epoxide group per molecule and free from functional groups other than epoxide and hydroxyl groups. The former are here included, but the latter, i. e., highly resinous or insoluble types, are not.

In summary then in light of what has been said, compounds suitable for reaction with amines may be summarized by the following formula:

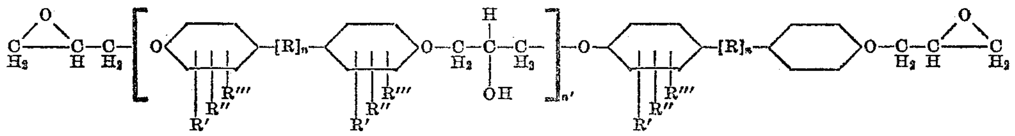

which are polyether derivatives of polyhydric phenols containing an average of more than one epoxide group per molecule and free from functional groups other than epoxide and hydroxyl groups.

or for greater simplicity the formula could be restated thus:

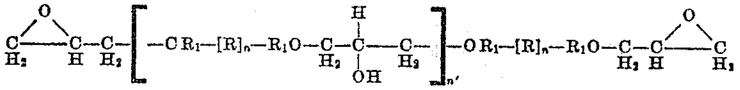

in which the various characters have their prior significance and in which $R_1O$ is the divalent radical obtained by the elimination of a hydroxyl halogen atom and a nuclear hydrogen atom from the phenol

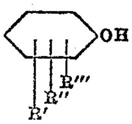

in which R', R'', and R''' represent hydrogen and hydrocarbon substituents of the aromatic nucleus, said substituent member having not over 18 carbon atoms; *n* represents an integer selected from the class of zero and 1, and *n'* represents a whole number not greater than 3.

Referring now to what has been said previously, to wit, compounds having both an epoxy ring or the equivalent and also a hydroxyl group, one need go no further than to consider the reaction product of

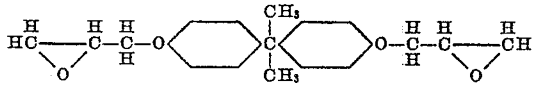

and bisphenol A in a mole-for-mole ratio, since the initial reactant would yield a product having an unreacted epoxy ring and two reactive hydroxyl radicals. Referring again to a previous formula, consider an example where two moles of bisphenol A have been reacted with 3 moles of epichlorohydrin. The simplest compound formed would be thus:

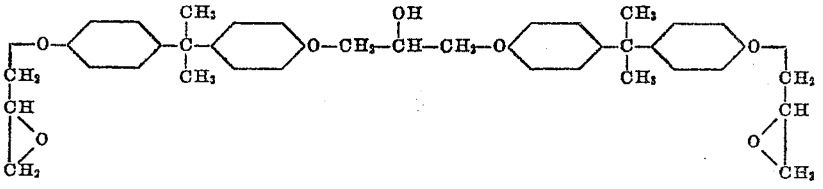

Such a compound is comparable to other compounds having both the hydroxyl and epoxy ring such as 9,10-epoxy octadecanol. The ease with which this type of compound polymerizes is pointed out by U. S. Patent No. 2,457,329, dated December 28, 1948, to Swern et al.

The same difficulty which involves the tendency to polymerize on the part of compounds having a reactive ring and a hydroxyl radical may be illustrated by compounds where, instead of the oxirane ring (1,2-epoxy ring) there is present a 1,3-epoxy ring. Such compounds are derivatives of trimethylene oxide rather than ethylene oxide. See U. S. Patents Nos. 2,462,047 and 2,462,048, both dated February 15, 1949, to Wyler.

PART 3

*Subdivision A*

The preparations of the diepoxy derivatives of the diphenols, which are sometimes referred to as diglycidyl ethers, have been described in a number of patents. For convenience, reference will be made to two only, to wit, aforementioned U. S. Patent 2,506,486, and aforementioned U. S. Patent No. 2,530,353.

Purely by way of illustration, the following diepoxides, or diglycidyl ethers as they are sometimes termed, are included for purpose of illustration. These particular compounds are described in the two patents just mentioned.

TABLE I

| Example number | Diphenol | Diglycidyl ether | Patent reference |
|---|---|---|---|
| 1A | $CH_2(C_6H_4OH)_2$ | Di(epoxypropoxyphenyl)methane | 2, 506, 486 |
| 2A | $CH_3CH(C_6H_4OH)_2$ | Di(epoxypropoxyphenyl)methylmethane | 2, 506, 486 |
| 3A | $(CH_3)_2C(C_6H_4OH)_2$ | Di(epoxypropoxyphenyl)dimethylmethane | 2, 506, 486 |
| 4A | $C_2H_5C(CH_3)(C_6H_4OH)_2$ | Di(epoxypropoxyphenyl)ethylmethylmethane | 2, 506, 486 |
| 5A | $(C_2H_5)_2C(C_6H_4OH)_2$ | Di(epoxypropoxyphenyl)diethylmethane | 2, 506, 486 |
| 6A | $CH_3C(C_3H_7)(C_6H_4OH)_2$ | Di(epoxypropoxyphenyl)methylpropylmethane | 2, 506, 486 |
| 7A | $CH_3C(C_6H_5)(C_6H_4OH)_2$ | Di(epoxypropoxyphenyl)methylphenylmethane | 2, 506, 486 |
| 8A | $C_2H_5C(C_6H_5)(C_6H_4OH)_2$ | Di(epoxypropoxyphenyl)ethylphenylmethane | 2, 506, 486 |
| 9A | $C_3H_7C(C_6H_5)(C_6H_4OH)_2$ | Di(epoxypropoxyphenyl)propylphenylmethane | 2, 506, 486 |
| 10A | $C_4H_9C(C_6H_5)(C_6H_4OH)_2$ | Di(epoxypropoxyphenyl)butylphenylmethane | 2, 506, 486 |
| 11A | $(CH_3C_6H_4)CH(C_6H_4OH)_2$ | Di(epoxypropoxyphenyl)tolylmethane | 2, 506, 486 |
| 12A | $(CH_3C_6H_4)C(CH_3)(C_6H_4OH)_2$ | Di(epoxypropoxyphenyl)tolylmethylmethane | 2, 506, 486 |
| 13A | Dihydroxy diphenyl | 4,4′-bis(2,3-epoxypropoxy)diphenyl | 2, 530, 353 |
| 14A | $(CH_3)C(C_4H_5.C_6H_3OH)_2$ | 2,2-bis(4-(2,3-epoxypropoxy)2-tertiarybutyl phenyl))propane | 2, 530, 353 |

*Subdivision B*

As to the preparation of low-molal polymeric epoxides or mixtures reference is made to numerous patents and particularly the aforementioned U. S. Patents Nos. 2,575,558 and 2,582,985.

In light of aforementioned U. S. Patent No. 2,575,558, the following examples can be specified by reference to the formula therein provided one still bears in mind it is in essence an over-simplification.

TABLE II

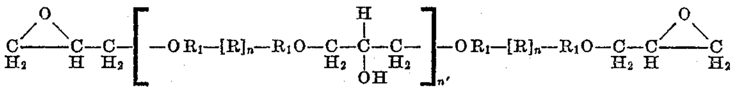

(in which the characters have their previous significance)

| Example number | —$R_1O$— from $HR_1OH$ | —R— | n | n′ | Remarks |
|---|---|---|---|---|---|
| B1 | Hydroxy benzene | $CH_3$<br>—C—<br>$CH_3$ | 1 | 0, 1, 2 | Phenol known as bis-phenol A. Low polymeric mixture about ⅔ or more where $n'=0$, remainder largely where $n'=1$, some where $n'=2$. |
| B2 | do | $CH_3$<br>—C—<br>$CH_2$<br>$CH_3$ | 1 | 0, 1, 2 | Phenol known as bis-phenol B. See note regarding B1 above. |
| B3 | Orthobutylphenol | $CH_3$<br>—C—<br>$CH_3$ | 1 | 0, 1, 2 | Even though $n'$ is preferably 0, yet the usual reaction product might well contain materials where $n'$ is 1, or to a lesser degree 2. |
| B4 | Orthoamylphenol | $CH_3$<br>—C—<br>$CH_3$ | 1 | 0, 1, 2 | Do. |
| B5 | Orthooctylphenol | $CH_3$<br>—C—<br>$CH_3$ | 1 | 0, 1, 2 | Do. |
| B6 | Orthononyl phenol | $CH_3$<br>—C—<br>$CH_3$ | 1 | 0, 1, 2 | Do. |
| B7 | Orthododecylphenol | $CH_3$<br>—C—<br>$CH_3$ | 1 | 0, 1, 2 | Do. |
| B8 | Metacresol | $CH_3$<br>—C—<br>$CH_3$ | 1 | 0, 1, 2 | See prior note. This phenol used as initial material is known as bis-phenol C. For other suitable bis-phenols see U. S. Patent 2,564,191. |
| B9 | do | $CH_3$<br>—C—<br>$CH_2$<br>$CH_3$ | 1 | 0, 1, 2 | See prior note. |
| B10 | Dibutyl (ortho-para) phenol | H<br>—C—<br>H | 1 | 0, 1, 2 | Do. |

TABLE II—Continued

| Example number | —R₁O— from HR₁OH | —R— | n | n' | Remarks |
|---|---|---|---|---|---|
| B11 | Diamyl (ortho-para) phenol | H<br>—C—<br>H | 1 | 0, 1, 2 | See prior note. |
| B12 | Dioctyl (ortho-para) phenol | H<br>—C—<br>H | 1 | 0, 1, 2 | Do. |
| B13 | Dinonyl (ortho-para) phenol | H<br>—C—<br>H | 1 | 0, 1, 2 | Do. |
| B14 | Diamyl (ortho-para) phenol | H<br>—C—<br>\|<br>$CH_3$ | 1 | 0, 1, 2 | Do. |
| B15 | do | H<br>—C—<br>\|<br>$C_2H_5$ | 1 | 0, 1, 2 | Do. |
| B16 | Hydroxy benzene | O<br>\|<br>—S—<br>\|<br>O | 1 | 0, 1, 2 | Do. |
| B17 | Diamyl phenol (ortho-para) | —S—S— | 1 | 0, 1, 2 | Do. |
| B18 | do | —S— | 1 | 0, 1, 2 | Do. |
| B19 | Dibutyl phenol (ortho-para) | H H<br>—C—C—<br>H H | 1 | 0, 1, 2 | Do. |
| B20 | do | H H<br>—C—C—<br>H H | 1 | 0, 1, 2 | Do. |
| B21 | Dinonyl phenol (ortho-para) | H H<br>—C—C—<br>H H | 1 | 0, 1, 2 | Do. |
| B22 | Hydroxy benzene | O<br>‖<br>—C— | 1 | 0, 1, 2 | Do. |
| B23 | do | None | 0 | 0, 1, 2 | Do. |
| B24 | Ortho-isopropyl phenol | $CH_3$<br>\|<br>—C—<br>\|<br>$CH_3$ | 1 | 0, 1, 2 | See prior note. (As to preparation of 4,4'-isopropylidene bis-(2-isopropylphonel) see U. S. Patent No. 2,482,748, dated Sept. 27, 1949, to Dietzler.) |
| B25 | Para-octyl | $—CH_2—S—CH_2$ | 1 | 0, 1, 2 | See prior note. (As to preparation of the phenol sulfide see U. S. Patent No. 2,488,134, dated Nov. 15, 1949, to Mikeska et al.) |
| B26 | Hydroxybenzene | $CH_3$<br>\|<br>—C—<br>\|<br>$CH_2$<br>\|<br>O<br>\|<br>$C_2H_5$ | 1 | 0, 1, 2 | See prior note. (As to preparation of the phenol sulfide see U. S. Patent No. 2,526,545.) |

*Subdivision C*

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglycidyl ether regardless of the nature of the bond between the two phenolic nuclei. For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol. Such substituents are usually in the ortho position and may be illustrated by a phenol of the following composition:

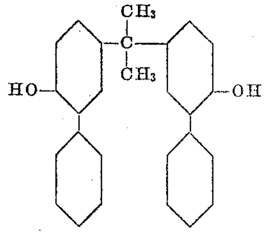

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc.

Other samples include:

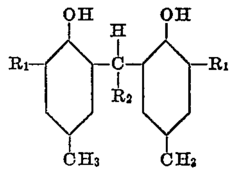

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups, and wherein said alkyl group contains at least 3 carbon atoms. See U. S. Patent No. 2,515,907.

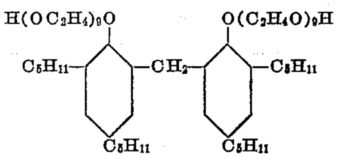

in which the $-C_5H_{11}$ groups are secondary amyl groups. See U. S. Patent No. 2,504,064.

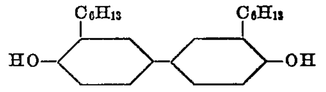

See U. S. Patent No. 2,285,563.

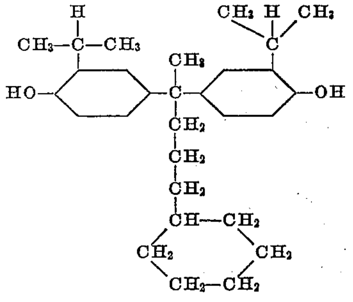

See U. S. Patent No. 2,503,196.

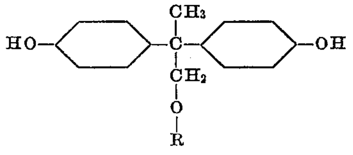

wherein R is a member of the group consisting of alkyl, and alkoxyalkyl radicals containing from 1 to 5 carbon atoms, inclusive, and aryl and chloraryl radicals of the benzene series. See U. S. Patent No. 2,526,545.

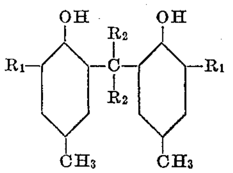

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. See U. S. Patent No. 2,515,906.

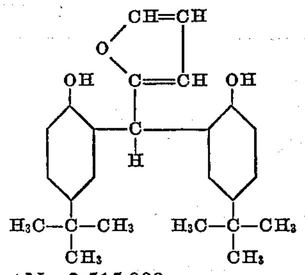

See U. S. Patent No. 2,515,908.

As to sulfides, the following compound is of interest:

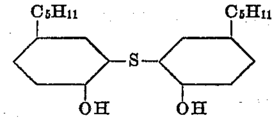

See U. S. Patent No. 2,331,448.

As to descriptions of various suitable phenol sulfides, reference is made to the following patents: U. S. Patents Nos. 2,246,321, 2,207,719, 2,174,248, 2,139,766, 2,244,021, and 2,195,539.

As to sulfones, see U. S. Patent No. 2,122,958.

As to suitable compounds obtained by the use of formaldehyde or some other aldehyde, particularly compounds such as

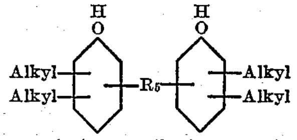

in which $R_5$ is a methylene radical, or a substituted methylene radical which represents the residue of an aldehyde and is preferably the unsubstituted methylene radical derived from formaldehyde. See U. S. Patent No. 2,430,002.

See also U. S. Patent No. 2,581,919 which describes di(dialkyl cresol) sulfides which include the monosulfides, the disulfides, and the polysulfides. The following formula represents the various dicresol sulfides of this invention:

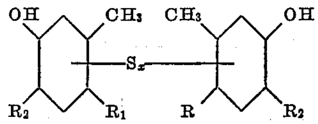

in which $R_1$ and $R_2$ are alkyl groups, the sum of whose carbon atoms equals 6 to about 20, and $R_1$ and $R_2$ each preferably contain 3 to about 10 carbon atoms, and $x$ is 1 to 4. The term "sulfides" as used in this text, therefore, includes monosulfide, disulfide, and polysulfides.

PART 4

This part is concerned with the preparation of phenol-aldehyde resins of the kind described in detail in U. S. Patent No. 2,499,370, dated March 7, 1950, to De Groote and Keiser, with the following qualifications; said aforementioned patent is limited to resins obtained from difunctional phenols having 4 to 12 carbon atoms in the substituent hydrocarbon radical. For the present purpose the substituent may have as many as 18 carbon atoms, as in the case of resins prepared from tetradecylphenol, substantially para-tetradecylphenol, commercially available. Similarly, resins can be prepared from hexadecylphenol or octadecylphenol. This feature will be referred to subsequently.

In addition to U. S. Patent No. 2,499,370, reference is made also to the following U. S. Patents: Nos. 2,499,365; 2,499,366 and 2,499,367, all dated March 7, 1950, to De Groote and Keiser. These patents, along with the other two previously mentioned patents, described phenolic resins of the kind herein employed as initial materials.

For practical purposes, the resins having 4 to 12 carbon atoms are most satisfactory, with the additional $C_{14}$ carbon atom also being very satisfactory. The increased cost of the $C_{16}$ and $C_{18}$ carbon atom phenol renders these raw materials of less importance, at least at the present time.

Patent 2,499,370 describes in detail methods of preparing resins useful as intermediates for preparing the products of the present application, and reference is made to that patent for such detailed description and to Examples 1*a* through 103*a* of that patent for examples of suitable resins.

As previously noted, the hydrocarbon substituent in the phenol may have as many as 18 carbon atoms, as illustrated by tetradecylphenol, hexadecylphenol and octadecylphenol, reference in each instance being to the difunctional phenol, such as the ortho- or para-substituted phenol or a mixture of the same. Such resins are described also in issued patents, for instance, U. S. Patent No. 2,499,365, dated March 7, 1950, to De Groote and Keiser, such as Example 71*a*.

It is sometimes desirable to present the resins herein employed in an over-simplified form which has appeared from time to time in the literature, and particularly in the patent literature, for instance, it has been stated that the composition is approximated in an idealized form by the formula

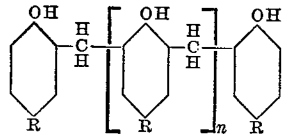

In the above formula *n* represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., *n* varies from 1 to 4; R represents an aliphatic hydrocarbon substituent, generally an alkyl radical having from 4 to 14 carbon atoms, such as butyl, amyl, hexyl, decyl or dodecyl radicals. Where the divalent bridge radical is shown as being derived from formaldehyde it may, of course, be derived from any other reactive aldehyde having 8 carbon atoms or less.

In the above formula the aldehyde employed in the resin manufacture is formaldehyde. Actually, some other aldehyde such as acetaldehyde, propionaldehyde, or butyraldehyde may be used. The resin unit can be exemplified thus:

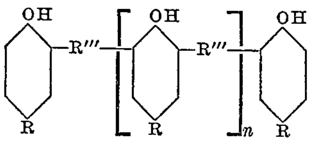

in which R''' is the divalent radical obtained from the particular aldehyde employed to form the resin.

As previously stated, the preparation of resins, the kind herein employed as reactants, is well known. See U. S. Patent No. 2,499,368, dated March 7, 1950, to De Groote and Keiser. Resins can be made using an acid catalyst or basic catalyst or a catalyst showing neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 100ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for *n* as, for example, 3.5, 4.5 or 5.2.

In the actual manufacture of the resins we found no reason for using other than those which are lowest in price and most readily available commercially. For purpose of convenience suitable resins are characterized in the following table:

*TABLE III*

| Example number | R | Position of R | R''' derived from— | *n* | Mol. wt. of resin molecule (based on *n*+2) |
|---|---|---|---|---|---|
| 1*a* | Phenyl | Para | Formaldehyde. | 3.5 | 992.5 |
| 2*a* | Tertiary butyl | do | do | 3.5 | 882.5 |
| 3*a* | Secondary butyl | Ortho | do | 3.5 | 882.5 |
| 4*a* | Cyclo-hexyl | Para | do | 3.5 | 1,025.5 |
| 5*a* | Tertiary amyl | do | do | 3.5 | 959.5 |
| 6*a* | Mixed secondary and tertiary amyl. | Ortho | do | 3.5 | 805.5 |
| 7*a* | Propyl | Para | do | 3.5 | 805.5 |
| 8*a* | Tertiary hexyl | do | do | 3.5 | 1,036.5 |
| 9*a* | Octyl | do | do | 3.5 | 1,190.5 |
| 10*a* | Nonyl | do | do | 3.5 | 1,267.5 |
| 11*a* | Decyl | do | do | 3.5 | 1,344.5 |
| 12*a* | Dodecyl | do | do | 3.5 | 1,498.5 |
| 13*a* | Tertiary butyl | do | Acetaldehyde. | 3.5 | 945.5 |
| 14*a* | Tertiary amyl | do | do | 3.5 | 1,022.5 |
| 15*a* | Nonyl | do | do | 3.5 | 1,330.5 |
| 16*a* | Tertiary butyl | do | Butyraldehyde | 3.5 | 1,071.5 |
| 17*a* | Tertiary amyl | do | do | 3.5 | 1,148.5 |
| 18*a* | Nonyl | do | do | 3.5 | 1,456.5 |
| 19*a* | Tertiary butyl | do | Propionaldehyde. | 3.5 | 1,008.5 |
| 20*a* | Tertiary amyl | do | do | 3.5 | 1,085.5 |
| 21*a* | Nonyl | do | do | 3.5 | 1,393.5 |
| 22*a* | Tertiary butyl | do | Formaldehyde. | 4.2 | 996.6 |
| 23*a* | Tertiary amyl | do | do | 4.2 | 1,083.4 |
| 24*a* | Nonyl | do | do | 4.2 | 1,430.6 |
| 25*a* | Tertiary butyl | do | do | 4.8 | 1,094.4 |
| 26*a* | Tertiary amyl | do | do | 4.8 | 1,189.6 |
| 27*a* | Nonyl | do | do | 4.8 | 1,570.4 |
| 28*a* | Tertiary amyl | do | do | 1.5 | 604.0 |
| 29*a* | Cyclo-hexyl | do | do | 1.5 | 646.0 |
| 30*a* | Hexyl | do | do | 1.5 | 653.0 |
| 31*a* | do | do | Acetaldehyde. | 1.5 | 688.0 |
| 32*a* | Octyl | do | do | 1.5 | 786.0 |
| 33*a* | Nonyl | do | do | 1.5 | 835.0 |
| 34*a* | Octyl | do | Butyraldehyde. | 2.0 | 986.0 |
| 35*a* | Nonyl | do | do | 2.0 | 1,028.0 |
| 36*a* | Amyl | do | do | 2.0 | 860.0 |
| 37*a* | Butyl | do | Formaldehyde. | 2.0 | 636.0 |
| 38*a* | Amyl | do | do | 2.0 | 692.0 |
| 39*a* | Hexyl | do | do | 2.0 | 748.0 |
| 40*a* | Cyclo-hexyl | do | do | 2.0 | 740.0 |

PART 5

There have been issued a substantial number of patents which give detailed description of the preparation of oxyalkylated derivatives of resins of the kind previously described. For example, see U. S. Patents 2,499,365; 2,499,366; 2,499,367; 2,499,368, and 2,499,370, all dated March 7, 1950, to De Groote and Keiser.

More specifically, a number of other patents have appeared in which the oxyethylation step is given with considerable detail. See, for example, U. S. Patents 2,581,376; 2,581,377; 2,581,378; 2,581,379; 2,581,380, and 2,581,381, all dated January 8, 1952, to De Groote and Keiser. As to further examples, see U. S. Patent 2,602,052, dated July 1, 1952 to De Groote.

The oxypropylation or, for that matter, the treatment of resins with butylene oxide, glycide, or methylglycide, has been described in the first of the series in the above mentioned patents, i. e., those issuing in 1950.

Reference is made to U. S. Patent, 2,557,081, dated June 19, 1951, to De Groote and Keiser. This particular patent describes in considerable detail resins which are first treated with propylene oxide and then with ethylene oxide or with ethylene oxide and then propylene oxide or with both oxides simultaneously.

In order to avoid an extensive repetition of what is already decribed in detail in the patent literature, we are referring to the tables beginning in column 21 of U. S. Patent 2,581,376 and extending through column 36. We have simply numbered these products beginning with 1*b*, allotting, of course, five numbers to each table beginning with the first table. For convenience these sixteen tables are summarized in the following table:

TABLE IV

| Ex. No. | Phenol | Aldehyde | Solvent, lbs. | Resin, lbs. | Ethylene oxide, lbs. |
|---|---|---|---|---|---|
| 1*b* | Para-tertiary amyl. | Formaldehyde | 14.25 | 15.75 | 4.00 |
| 2*b* | do | do | 10.90 | 12.10 | 15.25 |
| 3*b* | do | do | 7.13 | 7.93 | 19.69 |
| 4*b* | do | do | 3.84 | 4.25 | 16.15 |
| 5*b* | do | do | 1.80 | 2.04 | 10.20 |
| 6*b* | Nonyl | do | 15.00 | 15.00 | 3.00 |
| 7*b* | do | do | 10.00 | 10.00 | 9.40 |
| 8*b* | do | do | 7.27 | 7.27 | 13.70 |
| 9*b* | do | do | 3.15 | 3.15 | 8.95 |
| 10*b* | do | do | 2.10 | 2.10 | 8.00 |
| 11*b* | Para-octyl | do | 14.20 | 15.80 | 3.25 |
| 12*b* | do | do | 11.10 | 12.40 | 12.50 |
| 13*b* | do | do | 6.64 | 7.36 | 15.00 |
| 14*b* | do | do | 4.40 | 4.90 | 14.80 |
| 15*b* | do | do | 4.10 | 4.58 | 18.52 |
| 16*b* | Menthyl | do | 13.65 | 16.35 | 3.00 |
| 17*b* | do | do | 10.00 | 12.00 | 10.75 |
| 18*b* | do | do | 5.48 | 6.58 | 10.85 |
| 19*b* | do | do | 4.10 | 4.90 | 13.15 |
| 20*b* | do | do | 3.10 | 3.72 | 13.43 |
| 21*b* | Para-secondary butyl. | do | 14.45 | 15.55 | 4.35 |
| 22*b* | do | do | 8.48 | 9.17 | 16.00 |
| 23*b* | do | do | 4.82 | 5.18 | 14.25 |
| 24*b* | do | do | 3.85 | 4.15 | 17.00 |
| 25*b* | do | do | 2.65 | 2.85 | 15.45 |
| 26*b* | Menthyl | Propionaldehyde | 12.80 | 17.20 | 2.75 |
| 27*b* | do | do | 8.55 | 11.50 | 9.30 |
| 28*b* | do | do | 3.77 | 5.08 | 13.10 |
| 29*b* | do | do | 5.20 | 7.00 | 17.00 |
| 30*b* | do | do | 2.10 | 2.83 | 9.12 |
| 31*b* | Para-tertiary amyl. | Furfural | 11.20 | 18.00 | 3.50 |
| 32*b* | do | do | 8.45 | 13.60 | 12.65 |
| 33*b* | do | do | 4.50 | 8.00 | 14.50 |
| 34*b* | do | do | 3.42 | 5.48 | 15.10 |
| 35*b* | do | do | 2.05 | 3.65 | 13.35 |
| 36*b* | Menthyl | do | 10.25 | 17.75 | 2.50 |
| 37*b* | do | do | 7.60 | 13.15 | 9.35 |
| 38*b* | do | do | 4.22 | 6.98 | 10.00 |
| 39*b* | do | do | 3.76 | 6.24 | 13.25 |
| 40*b* | do | do | 2.40 | 4.15 | 11.70 |
| 41*b* | Para-octyl | do | 12.10 | 18.60 | 3.00 |
| 42*b* | do | do | 9.25 | 14.25 | 11.00 |
| 43*b* | do | do | 6.72 | 10.32 | 14.91 |
| 44*b* | do | do | 5.52 | 8.52 | 19.81 |
| 45*b* | do | do | 1.75 | 2.70 | 8.40 |
| 46*b* | Para-phenyl | do | 13.90 | 16.70 | 3.00 |
| 47*b* | do | do | 10.35 | 12.45 | 12.20 |
| 48*b* | do | do | 8.90 | 10.70 | 19.00 |
| 49*b* | do | do | 5.20 | 6.26 | 16.64 |
| 50*b* | do | do | 3.60 | 4.32 | 15.68 |
| 51*b* | Para-secondary nonyl. | do | 10.85 | 20.75 | 3.00 |
| 52*b* | do | do | 8.28 | 15.85 | 11.77 |
| 53*b* | do | do | 5.95 | 11.35 | 16.75 |
| 54*b* | do | do | 4.46 | 8.52 | 19.07 |
| 55*b* | do | do | 2.57 | 4.93 | 14.50 |
| 56*b* | ---- | ---- | ---- | ---- | ---- |

TABLE IV—Continued

| Ex. No. | Phenol | Aldehyde | Solvent, lbs. | Resin, lbs. | Ethylene oxide, lbs. |
|---|---|---|---|---|---|
| 57*b* | Para-phenyl | Formaldehyde | 11.00 | 9.00 | 11.75 |
| 58*b* | ---- | ---- | ---- | ---- | ---- |
| 59*b* | ---- | ---- | ---- | ---- | ---- |
| 60*b* | Para-phenyl | ---- | 3.41 | 2.80 | 13.64 |
| 61*b* | Para-secondary butyl. | Furfural | 12.00 | 17.90 | 3.50 |
| 62*b* | do | do | 9.35 | 13.92 | 13.23 |
| 63*b* | do | do | 6.25 | 8.95 | 17.00 |
| 64*b* | do | do | 4.35 | 6.50 | 18.40 |
| 65*b* | do | do | 3.02 | 4.34 | 16.49 |
| 66*b* | Para-octyl | Propionaldehyde | 13.30 | 16.90 | 3.00 |
| 67*b* | do | do | 10.20 | 12.90 | 11.30 |
| 68*b* | do | do | 6.46 | 8.24 | 16.50 |
| 69*b* | do | do | 3.86 | 4.87 | 13.02 |
| 70*b* | do | do | 2.94 | 3.75 | 13.26 |
| 71*b* | Para-nonyl | do | 10.90 | 18.00 | 3.00 |
| 72*b* | do | do | 8.25 | 13.60 | 11.50 |
| 73*b* | do | do | 5.65 | 9.35 | 15.75 |
| 74*b* | do | do | 3.15 | 5.25 | 13.45 |
| 75*b* | do | do | 1.94 | 3.21 | 10.65 |
| 76*b* | Para-tertiary amyl. | do | 12.60 | 16.20 | 3.50 |
| 77*b* | do | do | 9.52 | 12.24 | 12.89 |
| 78*b* | do | do | 6.50 | 8.30 | 17.75 |
| 79*b* | do | do | 4.25 | 5.45 | 17.25 |
| 80*b* | do | do | 2.69 | 3.43 | 14.55 |

NOTE.—For ease of comparation blanks (----) appear in the above table where blanks appear in previously mentioned tables in U. S. Patent 2,581,376.

Oxypropylated derivatives comparable to 1*b* through 80*b* as described above can readily be obtained by substituting a molar equivalent amount of propylene oxide, i. e., 56 lbs. of propylene oxide, for example, for each 44 lbs. of ethylene oxide. We have prepared such a similar series but for sake of brevity only a few will be included for purposes of illustration.

TABLE V

| Ex. No. | Oxypropylated analog | Phenol | Aldehyde | Solvent, lbs. | Resin, lbs. | Propylene oxide, lbs. |
|---|---|---|---|---|---|---|
| 1*c* | 1*b* | Para-tertiary amyl. | Formaldehyde. | 14.25 | 15.72 | 5.10 |
| 2*c* | 2*b* | do | do | 10.90 | 12.10 | 19.40 |
| 3*c* | 3*b* | do | do | 7.13 | 7.92 | 25.30 |
| 4*c* | 4*b* | do | do | 3.84 | 4.25 | 23.00 |
| 5*c* | 5*b* | do | do | 1.80 | 2.04 | 13.00 |
| 66*c* | 66*b* | Para-octyl | Propionaldehyde. | 13.30 | 16.90 | 3.82 |
| 67*c* | 67*b* | do | do | 10.20 | 12.90 | 14.40 |
| 68*c* | 68*b* | do | do | 6.46 | 8.24 | 21.00 |
| 69*c* | 69*b* | do | do | 3.86 | 4.87 | 16.60 |
| 70*c* | 70*b* | do | do | 2.94 | 3.75 | 16.80 |
| 76*c* | 76*b* | Para-tertiary amyl. | Formaldehyde. | 12.60 | 16.20 | 4.46 |
| 77*c* | 77*b* | do | do | 9.52 | 12.24 | 16.45 |
| 78*c* | 78*b* | do | do | 6.50 | 8.30 | 22.60 |
| 79*c* | 79*b* | do | do | 4.25 | 5.45 | 22.00 |
| 80*c* | 80*b* | do | do | 2.69 | 3.43 | 18.55 |

As an illustration of oxypropylated resins involving the use of both ethylene and propylene oxide, reference is made to the aforementioned U. S. Patent 2,257,081, dated June 19, 1951, to De Groote and Keiser. The last table in column 28 of said patent describes in detail the preparation of a series of oxyalkylated resins in which both propylene and ethylene oxide are employed. Simply by way of illustration a series of 27 compounds are included, the descriptions of which appear in detail in said aforementioned U. S. Patent 2,577,081 to De Groote and Keiser.

TABLE VI

| Ex. No. | See U. S. Pat. 2,557,081 | | Resin used | Resin, lbs. | Propylene oxide, lbs. | Propylene oxide, lbs. | Wt. of xylene | Flake caustic soda, ounces |
|---|---|---|---|---|---|---|---|---|
| | Ex. No. in above patent | Point on graph on above patent | | | | | | |
| 1d | A | 1 | Tert. amylphenol formaldehyde | 6 | 3 | 1 | 10 | 1 |
| 2d | B | 5 | do | 5 | 4 | 1 | 10 | 1 |
| 3d | C | 8 | do | 3 | 6 | 1 | 10 | 1 |
| 4d | D | 2 | do | 1 | 21.5 | 2.5 | 25 | 2 |
| 5d | E | 9 | do | 1 | 15 | 9 | 25 | 2 |
| 6d | F | 6 | do | 1 | 10 | 15 | 25 | 2 |
| 7d | G | 3 | do | 1 | 2.5 | 21.5 | 25 | 2 |
| 8d | H | 7 | do | 5 | 1 | 4 | 10 | 1 |
| 9d | I | 4 | do | 6 | 1 | 3 | 10 | 1 |
| 10d | A | 1 | Tert. butylphenol formaldehyde | 6 | 3 | 1 | 10 | 1 |
| 11d | B | 5 | do | 5 | 4 | 1 | 10 | 1 |
| 12d | C | 8 | do | 3 | 6 | 1 | 10 | 1 |
| 13d | D | 2 | do | 1 | 21.5 | 2.5 | 25 | 2 |
| 14d | E | 9 | do | 1 | 15 | 9 | 25 | 2 |
| 15d | F | 6 | do | 1 | 10 | 14 | 25 | 2 |
| 16d | G | 3 | do | 1 | 2.5 | 21.5 | 25 | 2 |
| 17d | H | 7 | do | 5 | 1 | 4 | 10 | 1 |
| 18d | I | 4 | do | 6 | 1 | 3 | 10 | 1 |
| 19d | A | 1 | Nonylphenol-formaldehyde | 6 | 3 | 1 | 10 | 1 |
| 20d | B | 5 | do | 5 | 4 | 1 | 10 | 1 |
| 21d | C | 8 | do | 3 | 6 | 1 | 10 | 1 |
| 22d | D | 2 | do | 1 | 21 5 | 2.5 | 25 | 2 |
| 23d | E | 9 | do | 1 | 15 | 9 | 25 | 2 |
| 24d | F | 6 | do | 1 | 10 | 14 | 25 | 2 |
| 25d | G | 3 | do | 1 | 2.5 | 21.5 | 25 | 2 |
| 26d | H | 7 | do | 5 | 1 | 4 | 10 | 1 |
| 27d | I | 4 | do | 6 | 1 | 3 | 10 | 1 |

Note the first series of nine compounds, 1*d* through 9*d*, were prepared with a propylene oxide first and then ethylene oxide. The second 9, 10*d* through 18*d* inclusive, were prepared using ethylene oxide first and then propylene oxide, and the last 9, 19*d* through 27*d*, were prepared by random oxyalkylation, i. e., using a mixture of the two oxides.

In the preparation of the resins our preference is to use hydrocarbon substituted phenols, particularly para-substituted, in which the substituted radical R contains 4 to 18 carbon atoms and particularly 4 to 14 carbon atoms. The amount of alkylene oxide introduced may be comparatively large in comparison to the initial resin. For instance, there may be as much as 50 parts by weight of an oxide or mixed oxides used for each part by weight of resin employed.

It will be noted that the various resins referred to in the aforementioned U. S. Patent 2,499,370 are substantially the same type of materials as referred to in Table I. For instance, resin 3*a* of the table is substantially the same as 2*a* of the patent; resin 20*a* of the table is substantially the same as 34*a* of the patent; and resin 38*a* of the table is the same as 3*a* of the patent.

TABLE VII

| Example number | Molecular weight |
|---|---|
| 1b | 1,202 |
| 2b | 2,169 |
| 3b | 3,339 |
| 4b | 4,609 |
| 5b | 5,749 |
| 6b | 1,509 |
| 7b | 2,466 |
| 8b | 3,657 |
| 9b | 5,867 |
| 10b | 6,087 |
| 1c | 1,270 |
| 2c | 2,494 |
| 3c | 4,019 |
| 4c | 6,139 |
| 5c | 7,079 |
| 1d | 1,697 |
| 2d | 1,918 |
| 3d | 3,189 |
| 4d | 23,959 |
| 5d | 23,959 |
| 6d | 24,909 |
| 7d | 23,959 |
| 8d | 1,918 |
| 9d | 1,697 |

In reaction with polyepoxides, and particularly diepoxides, a large number of the previously described oxyalkylated resins have been employed. For convenience, the following list is selected indicating the previously described compounds and their molecular weights. Such resins are generally employed as a 50% solution and the polyepoxide employed is a 50% solution, usually both reactants being dissolved in xylene and sufficient sodium methylate added to act as a catalyst, for instance, 1 to 2%.

PART 6

*Subdivision A*

As previously pointed out, having the two types of reactants, i. e., the oxyalkylated phenol-aldehyde resins and the diglycidyl ethers or their equivalent, one can then proceed with either a single step reaction combining 4 moles of the oxyalkylated derivative with 3 moles of the diglycidyl ether or else one can employ a 2-step process in which one first combines 2 moles of the oxyalkylated phenol-aldehyde resin with one mole of the ether and then subsequently combines this product, which may be considered as an intermediate, with another mole of ether in the combination of 2 moles of the intermediate plus one mole of diglycidyl ether. For reasons previously indicated the instant part, i. e., Subdivision A, is concerned with a 2-step process. As noted above in the 2-step process the reactions which result in the formation of an intermediate involve two moles of an oxyalkylated phenol-aldehyde resin of the kind previously described and one mole of a diglycidyl ether as specified. The reaction is essentially an oxyalkylation reaction and thus may be considered as merely a continuance of the previous oxyalkylation reaction. The previous oxyalkylation reaction involved a monoepoxide as differentiated from a polyepoxide and particularly a diepoxide. The reactions take place in substantially the same way, i. e., by the opportunity to react at somewhere above the boiling point of water and below the point of decomposition, for example, 130–185° C. in the presence of a small amount of alkaline catalyst. Since the polyepoxide is non-volatile as compared, for example, with ethylene oxide, the reaction is comparatively simple. Purely from a mechanical standpoint it is a matter of convenience to conduct both classes of reactions in the same equipment. In other words, after the phenol-aldehyde resin has been reacted with ethylene oxide, propylene oxide or the like, it is subsequently reacted with a polyepoxide. The polyepoxide reaction can be conducted in an ordinary reaction vessel such as the usual glass laboratory equipment. This is particularly true of the kind used for resin manufacture as described in a number of patents, as for example, U. S. Patent No. 2,499,365. One can use a variety of catalysts in connection with the polyepoxide of the same class employed with monoepoxide. In fact, the reaction will go at an extremely slow rate without any catalyst at all. The usual catalysts include alkaline materials such as caustic soda, caustic potash, sodium methylate, etc. Other catalysts may be acidic in nature and are of the kind characterized by iron and tin chlorides. Furthermore, insoluble catalysts such as clays or specially prepared mineral catalysts have been used. For practical purposes, it is best to use the same catalyst as is used in the initial oxyalkylation step and in many cases there is sufficient residual catalyst to serve for the reaction involving the second oxyalkylation step, i. e., the polyepoxide. For this reason, we have preferred to use a small amount of finely divided caustic soda or sodium methylate as the initial catalyst and also the catalyst in the second stage. The amount generally employed is 1, 2, or 3% of these alkaline catalysts.

Actually, the reactions of polyepoxides with various resin materials have been thoroughly described in the literature and the procedure is, for all purposes, the same as with glycide which has been described previously.

It goes without saying that the reaction involving the polyepoxide can be conducted in the same manner as the monoepoxide as far as the presence of an inert solvent is concerned, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The solvent so selected should be one which, of course, is suitable in the oxyalkylation step involving the monoepoxides described subsequently. The solvent selected may depend on the ability to remove it by subsequent distillation if required. Here again it has been our preference to have a solvent present in the oxyalkylation involving the initial stage and permitting the solvent to remain. The amount of solvent may be insignificant, depending whether or not exhaustive oxyalkylation is employed. However, since the oxyalkylated phenol-aldehyde resins are almost invariably liquids there is no need for the presence of a solvent as when oxyalkylation involves a solid which may be rather high melting. Thus, it is immaterial whether there is solvent present or not and it is immaterial whether solvent was added in the first stage of oxyalkylation or not, and also it is immaterial whether there was solvent present in the second stage of oxyalkylation or not. The advantage of the presence of solvent is that sometimes it is a convenient way of controlling the reaction temperature and thus in the subsequent examples we have added sufficient xylene so as to produce a mixture which boils somewhere in the neighborhood of 125° to 140° C. and removes xylene so as to bring the boiling point of the mixture to about 140° C. during part of the reaction and subsequently removing more xylene so that the mixture refluxed at somewhere between 170° to 190° C. This was purely a convenience and need not be employed unless desired.

*Example 1e*

The oxyalkylated resin employed was the one previously identified as 2*b*, having a molecular weight of 2169; the amount employed was 217 grams. The resin was dissolved in approximately an equal weight of xylene. The mixture was heated to just short of the boiling point of water, i. e., a little below 100° C. Approximately one-half percent of sodium methylate was added, or, more exactly, 1.1 grams. The stirring was continued until there was a solution or distribution of the catalyst. The mixture was heated to a little past 100° C. and left at this temperature while 17 grams of the diepoxide (previously identified as 3A), dissolved in an equal weight of xylene, were added. After the diepoxide was added the temperature was permitted to rise to approximately 107° C. The time required to add the diepoxide was approximately one-half hour. The temperature rose in this period to about 125° C. The temperature rise was controlled by allowing the xylene to reflux over and to separate out the xylene by a phase separating trap. In any event, the temperature was raised shortly to 138–140° C. and allowed to reflux at this temperature for almost three hours. Tests indicated that the reaction was complete at the end of this time; in fact, it probably was complete at a considerably earlier stage. The xylene which had been separated out was returned to the mixture so that the reaction mass at the end of the procedure represented about 50% reaction product and 50% solvent. The procedure employed is, of course, simple in light of what has been said previously; in fact, it corresponds to the usual procedure employed in connection with an oxyalkylating agent such as glycide, i. e., a non-volatile oxyalkylating agent. At the end of the reaction period the mass obtained was a dark, viscous mixture. It could be bleached, of course, by use of charcoal, filtering earths, or the like.

Various examples obtained in substantially the same manner as employed are described in the following table:

TABLE VIII

| Ex. No. | Oxyalkylated resin | Amt., gms. | Diepoxide used | Amt., gms. | Catalyst ($NaOCH_3$), grams | Xylene, gms. | Molar ratio | Time of reaction, hrs. | Max. temp., ° C. | Color and physical state |
|---|---|---|---|---|---|---|---|---|---|---|
| 1*e* | 2*b* | 217 | 3A | 17 | 1.1 | 234 | 2:1 | 3 | 140 | Dark, viscous mass. |
| 2*e* | 4*b* | 460 | 3A | 17 | 2.4 | 477 | 2:1 | 4 | 145 | Do. |
| 3*e* | 7*b* | 247 | 3A | 17 | 1.3 | 264 | 2:1 | 3 | 150 | Do. |
| 4*e* | 10*b* | 609 | 3A | 17 | 3.1 | 626 | 2:1 | 4 | 148 | Do. |
| 5*e* | 2*c* | 249 | 3A | 17 | 1.3 | 266 | 2:1 | 2.5 | 150 | Do. |
| 6*e* | 3*c* | 402 | 3A | 17 | 2.0 | 419 | 2:1 | 4 | 146 | Do. |
| 7*e* | 5*c* | 708 | 3A | 17 | 3.6 | 725 | 2:1 | 5 | 152 | Do. |
| 8*e* | 2*d* | 192 | 3A | 17 | 1.0 | 209 | 2:1 | 2.5 | 142 | Do. |
| 9*e* | 3*d* | 319 | 3A | 17 | 1.6 | 336 | 2:1 | 3 | 147 | Do. |
| 10*e* | 6*d* | 249 | 3A | 17 | 1.2 | 250.7 | 2:1 | 3 | 155 | Do. |
| 1*f* | 2*b* | 217 | B1 | 27.5 | 1.2 | 244.5 | 2:1 | 3.5 | 145 | Do. |
| 2*f* | 4*b* | 460 | B1 | 27.5 | 2.4 | 487.5 | 2:1 | 4 | 150 | Do. |
| 3*f* | 7*b* | 247 | B1 | 27.5 | 1.3 | 274.5 | 2:1 | 4 | 152 | Do. |
| 4*f* | 10*b* | 609 | B1 | 27.5 | 3.1 | 636.5 | 2:1 | 5 | 158 | Do. |
| 5*f* | 2*c* | 249 | B1 | 27.5 | 1.3 | 276.5 | 2:1 | 4 | 146 | Do. |
| 6*f* | 3*c* | 402 | B1 | 27.5 | 1.2 | 429.5 | 2:1 | 5 | 150 | Do. |
| 7*f* | 5*c* | 708 | B1 | 27.5 | 2.6 | 735.5 | 2:1 | 5 | 152 | Do. |
| 8*f* | 2*d* | 192 | B1 | 27.5 | 1.0 | 219.5 | 2:1 | 3.5 | 148 | Do. |
| 9*f* | 3*d* | 319 | B1 | 27.5 | 1.7 | 346.5 | 2:1 | 4 | 150 | Do. |
| 10*f* | 6*d* | 249 | B1 | 2.8 | 1.2 | 251.8 | 2:1 | 3 | 152 | Do. |

TABLE IX

| Ex. No. | Oxyalkylated resin used | Probable molecular wt. of reaction product | Amount of product, grams | Amount of solvent, grams |
|---|---|---|---|---|
| 1e | 2b | 4,680 | 4,680 | 2,340 |
| 2e | 4b | 9,540 | 4,770 | 2,385 |
| 3e | 7b | 5,280 | 5,280 | 2,640 |
| 4e | 10b | 12,520 | 6,260 | 3,130 |
| 5e | 2c | 5,320 | 5,330 | 2,670 |
| 6e | 3c | 8,380 | 8,370 | 4,180 |
| 7e | 5c | 14,500 | 7,250 | 3,625 |
| 8e | 2d | 4,180 | 4,195 | 2,105 |
| 9e | 3d | 6,720 | 6,720 | 3,360 |
| 10e | 6d | 50,160 | 5,016 | 2,508 |
| 1f | 2b | 4,890 | 4,890 | 2,445 |
| 2f | 4b | 9,750 | 4,880 | 2,440 |
| 3f | 7b | 5,490 | 5,490 | 2,745 |
| 4f | 10b | 12,730 | 6,365 | 3,182 |
| 5f | 2c | 5,530 | 5,540 | 2,775 |
| 6f | 3c | 8,590 | 8,590 | 4,295 |
| 7f | 5c | 14,710 | 7,355 | 3,678 |
| 8f | 2d | 4,390 | 4,385 | 2,190 |
| 9f | 3d | 6,930 | 6,930 | 3,465 |
| 10f | 6d | 50,370 | 5,040 | 2,520 |

In some instances there seems to be a change takes place after the intermediate is allowed to stand for some period of time with the residual catalyst present. The nature of this change is not well defined but it may be due to the fact that there is present a small amount of the polyepoxide unreacted, which reacts slowly. As a rule, when the intermediate is to be stored for a period of time and then perhaps subjected to reaction with the same polyepoxide or perhaps a different polyepoxide of the same general kind, we prefer to neutralize the added caustic by the addition of a small amount of hydrochloric acid, sulphuric acid, phosphoric acid or an organic acid such as toluene sulfonic acid. A polydecylated benzene sulphonic is suitable.

If the intermediate is to be converted immediately from the 2:1 ratio to the 4:3 ratio then in that event there is no need to neutralize the catalyst present. Indeed, such catalyst is taken into consideration in calculating the amount of catalyst present. In other words, one need not add as much catalyst when the residual catalyst is present as one would have to add if it had been previously neutralized.

Reference to the 4:3 ratio means there can be some variation within reasonable limits, for instance, several percent one way or the other. In other words, one could use, for example, 3.9 or 4.1 moles instead of 4 moles, or one might use 2.9 or 3.1 moles instead of 3 moles. As the molal ratio of the polyepoxide to oxyalkylated resin increases, i. e., approaches a 1:1 ratio there is greater opportunity for cross-linking or side reactions; or, stated another way, gelation is more apt to take place. This is true of a polyepoxide which includes free hydroxyl groups to a greater degree than one which does not contain free hydroxyl groups.

We have found no difficulty particularly if the temperature range is kept lower than in the preparation of the intermediates, i. e., if in the 2-step process a temperature range of 80° C. to 90° C. is used in a later stage and preferably if this temperature is used even in the preparation of intermediates, i. e., the 2:1 ratio reactant. Everything else being equal additional solvent tends to reduce cross-linking and, in any event, when the reaction is complete it is preferable to eliminate alkalinity in the manner described above.

*Example 1g*

This is merely a continuation so as to change the reactant ratio in a previous derivative, to wit, Example 1*e*, described above. Example 1*e*, and other comparable compounds are conveniently referred to as "polyepoxide-derived intermediate products." In any event, 234 grams of this material dissolved in 246 grams of xylene, along with a total of 25 grams of sodium methylate as a catalyst, were treated in exactly the same manner as previously described, with 8.5 grams of diepoxide 3A. This is a molal ratio of 2:1 based on the intermediate to the diepoxide. The reaction time was one hour and a maximum temperature of 80° C. was employed. The resultant product was a dark viscous mass.

Similar derivative were obtained using other intermediates and also using diepoxide B1 previously described, all of which is summarized in the two tables following, to wit, Tables X and XI.

TABLE X

| Ex. No. | Polyepoxide derived intermediate product | Amt., gms. | Diepoxide used | Amt., gms. | Catalyst ($NaOCH_3$), gms. | Xylene, gms. | Molar ratio | Time of reaction, hrs. | Max. temp., ° C. | Color and physical state |
|---|---|---|---|---|---|---|---|---|---|---|
| 1g | 1e | 234 | 3A | 8.5 | 2.5 | 246 | 2:1 | 1 | 80 | Dark viscous mass. |
| 2g | 2e | 477 | 3A | 8.5 | 4.9 | 485 | 2:1 | 1 | 82 | Do. |
| 3g | 3e | 264 | 3A | 8.5 | 2.7 | 272 | 2:1 | 1 | 80 | Do. |
| 4g | 4e | 250 | 3A | 3.4 | 2.5 | 253 | 2:1 | 1 | 85 | Do. |
| 5g | 5e | 266 | 3A | 8.5 | 2.7 | 274 | 2:1 | 1 | 80 | Do. |
| 6g | 6e | 419 | 3A | 8.5 | 4.3 | 427 | 2:1 | 1 | 80 | Do. |
| 7g | 7e | 290 | 3A | 3.4 | 2.9 | 293 | 2:1 | 1 | 80 | Do. |
| 8g | 8e | 209 | 3A | 8.5 | 2.2 | 217 | 2:1 | 1 | 81 | Do. |
| 9g | 9e | 336 | 3A | 8.5 | 3.4 | 344 | 2:1 | 1 | 80 | Do. |
| 10g | 10e | 501 | 3A | 1.7 | 5.0 | 503 | 2:1 | 1 | 80 | Do. |
| 1h | 1f | 234 | B1 | 13.8 | 2.5 | 248 | 2:1 | 1 | 80 | Do. |
| 2h | 2f | 477 | B1 | 12.8 | 4.9 | 491 | 2:1 | 1 | 82 | Do. |
| 3h | 3f | 264 | B1 | 13.8 | 2.8 | 278 | 2:1 | 1 | 84 | Do. |
| 4h | 4f | 250 | B1 | 5.5 | 2.6 | 255 | 2:1 | 1 | 80 | Do. |
| 5h | 5f | 266 | B1 | 13.8 | 2.8 | 280 | 2:1 | 1 | 80 | Do. |
| 6h | 6f | 419 | B1 | 13.8 | 4.3 | 433 | 2:1 | 1 | 85 | Do. |
| 7h | 7f | 290 | B1 | 5.5 | 2.9 | 295 | 2:1 | 1 | 80 | Do. |
| 8h | 8f | 209 | B1 | 13.8 | 2.2 | 223 | 2:1 | 1 | 80 | Do. |
| 9h | 9f | 336 | B1 | 13.8 | 3.5 | 350 | 2:1 | 1 | 82 | Do. |
| 10h | 10f | 501 | B1 | 2.8 | 5.0 | 504 | 2:1 | 1 | 80 | Do. |

TABLE XI

| Ex. No. | Oxyalkylated resin used | Probable molecular wt. of reaction product | Amount of product, grams | Amount of solvent, grams |
|---|---|---|---|---|
| 1g | 1e | 9,700 | 4,850 | 2,425 |
| 2g | 2e | 19,420 | 4,855 | 2,428 |
| 3g | 3e | 10,900 | 5,450 | 2,725 |
| 4g | 4e | 25,380 | 2,538 | 1,269 |
| 5g | 5e | 10,980 | 5,490 | 2,745 |
| 6g | 6e | 17,100 | 3,420 | 1,710 |
| 7g | 7e | 29,340 | 5,868 | 2,934 |
| 8g | 8e | 8,700 | 4,350 | 2,175 |
| 9g | 9e | 12,780 | 2,756 | 1,378 |
| 10g | 10e | 100,660 | 4,026 | 2,013 |
| 1h | 1f | 10.330 | 5,165 | 2,582 |
| 2h | 2f | 20.050 | 4,010 | 2,005 |
| 3h | 3f | 11,530 | 2,306 | 1,153 |
| 4h | 4f | 26.010 | 5,202 | 2,601 |
| 5h | 5f | 11,610 | 2,322 | 1,161 |
| 6h | 6f | 17.730 | 3,546 | 1,773 |
| 7h | 7f | 29,970 | 5,994 | 2,997 |
| 8h | 8f | 9,330 | 4,665 | 2,332 |
| 9h | 9f | 14.410 | 2,882 | 1,441 |
| 10h | 10f | 101.290 | 5,064 | 2.532 |

*Subdivision B*

As previously noted, there is no need to employ a 2-stage procedure except to the extent that it is convenient. For instance, it would be convenient if a different polyepoxide were used in the second stage. However, as far as employing the 4:3 ratio of reactants instead of the 2:1 as a single step, it seems no description is necessary because the procedure would be obvious in light of what has been said. Purely, as an illustration, a number of examples will be included.

*Example 1gg*

This is a one-step procedure which in essence produces the same end products as in the case of Example 1*g* in Table X, preceding. 217 grams of the oxyalkylated resin previously identified as Example 2*b*, were reacted with 41.5 grams of diepoxide B1. The amount of catalyst used was 1.3 grams of sodium methylate. The amount of xylene used was 244.5 grams. The molal ratio of oxyalkylated resin to diepoxide was 4:3. The reaction time was approximately 4.5 hours. The maximum temperature employed was 83° C. The end product, of course, was substantially the same as that obtained under the heading of Example 1*g*, preceding. For this reason no additional data are included in regard to probable molecular weight, etc., as appeared in Table XI, for the reason that it is in essence identical as far as Example 1*g* is concerned and similarly, the data in regard to Example 2*gg* in Table XII are substantially identical in regard to Example 2*g* in Table XI.

residues obtained by the elimination of the aldehyde oxygen atom, the divalent radical

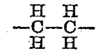

the divalent

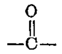

radical, the divalent sulfone radical, and the divalent monosulfide radical —S—, the divalent radical $—CH_2SCH_2—$, and the divalent disulfide radical —S—S—; said phenolic portion of the diepoxide being obtained from a phenol of the structure

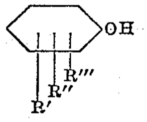

in which R′, R″, and R‴ represent a member of the class consisting of hydrogen and hydrocarbon substituents of the aromatic nucleus, said substituent member having not over 18 carbon atoms; said oxyalkylated phenol-aldehyde resins, reactant (A) being the products derived by oxyalkylation of (*aa*) and alpha-beta alkylene oxide having not more than 4 carbon atoms and selected from the class consisting of ethylene oxide, propylene oxide, butylene oxide, glycide and methylglycide, and (*bb*) an oxyalkylation-susceptible fusible, organic solvent-soluble, water-insoluble phenol-aldehyde resin; said resin being derived

TABLE XII

| Ex No. | Oxyalkylated resin | Amt., gms. | Diepoxide used | Amt., gms. | Catalyst ($NaOCH_3$), gms. | Xylene, gms. | Molar ratio | Time of reaction, hrs. | Max. temp., ° C. | Color and physical state |
|---|---|---|---|---|---|---|---|---|---|---|
| 1gg | 2b | 217 | B1 | 41.5 | 1.3 | 244.5 | 4:3 | 4.4 | 83 | Dark viscous mass. |
| 2gg | 4b | 460 | B1 | 41.5 | 2.5 | 487.5 | 4:3 | 5.5 | 84 | Do. |
| 3gg | 7b | 247 | B1 | 41.5 | 1.5 | 274.5 | 4:3 | 6.0 | 86 | Do. |
| 4gg | 10b | 609 | B1 | 41.5 | 3.3 | 636.5 | 4:3 | 5.5 | 88 | Do. |
| 5gg | 2c | 249 | B1 | 41.5 | 1.5 | 276.5 | 4:3 | 4.8 | 81 | Do. |
| 6gg | 3c | 402 | B1 | 41.5 | 1.4 | 429.5 | 4:3 | 4.9 | 82 | Do. |
| 7gg | 5c | 708 | B1 | 41.5 | 2.9 | 735.5 | 4:3 | 6.1 | 82 | Do. |
| 8gg | 2d | 192 | B1 | 41.5 | 1.3 | 319.5 | 4:3 | 5.6 | 83 | Do. |
| 9gg | 3d | 319 | B1 | 41.5 | 1.9 | 346.5 | 4:3 | 5.0 | 85 | Do. |
| 10gg | 6d | 249 | B1 | 4.10 | 1.4 | 251.8 | 4:3 | 4.0 | 87 | Do. |

PART 7

As to the use of conventional demulsifying agents reference is made to U. S. Patent No. 2,626,929, dated January 7, 1953, to De Groote, and particularly to Part 3. Everything that appears therein applies with equal force and effect to the instant process, noting only that where reference is made to Example 13*b* in said text beginning in column 15 and ending in column 18, reference should be to Examples 1*g* or 1*gg*, herein described.

Having thus described our invention, what we claim as new and desire to secure by Letters Patent, is:

1. A process for breaking petroleum emulsions of the water-in-oil type characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a phenolic polyepoxide free from reactive functional groups other than epoxy and hydroxyl groups, and cogenerically associated compounds formed in the preparation of said polyepoxides; said epoxides being monomers and low molal polymers not exceeding the tetramers; said epoxides being selected from the class consisting of (*a*) compounds where the phenolic nuclei are directly joined without an intervening bridge radical, and (*b*) compounds containing a radical in which two phenolic nuclei are joined by a divalent radical selected from the class consisting of ketone residues formed by the elimination of the ketonic oxygen atom, and aldehyde by reaction between a difunctional monohydric phenol and an aldehyde having not over 8 carbon atoms and reactive toward said phenol; said resin being formed in the substantial absence of trifunctional phenols; said phenol being of the formula

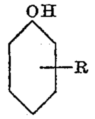

in which R is a hydrocarbon radical having not more than 24 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and *n* is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of four moles of (A) to three moles of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids;

and said reaction between (A) and (B) being conducted below the pyrolytic point of the reactants and the resultants of reaction.

2. A process for breaking petroleum emulsions of the water-in-oil type characterized by subjecting the emulsion to the action of a demulsifier including synthetic hydrophile products; said synthetic hydrophile products being the reaction product of (A) an oxyalkylated phenol- aldehyde resin containing a plurality of active hydrogen atoms, and (B) a member of the class consisting of (1) compounds of the following formula

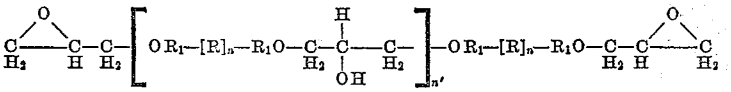

in which R represents a divalent radical selected from the class consisting of ketone residues formed by the elimination of the ketonic oxygen atom and aldehyde residues obtained by the elimination of the aldehydic oxygen atom, the divalent radical

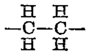

the divalent

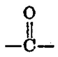

radical, the sulfone radical, and the divalent monosulfide radical —S—, the divalent radical $—CH_2SCH_2—$, and the divalent disulfide radical —S—S—; and $R_1O$ is the divalent radical obtained by the elimination of a hydroxyl hydrogen atom and a nuclear hydrogen atom from the phenol

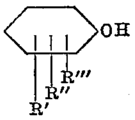

in which R′, R″, and R‴ represent a member of the class consisting of hydrogen and hydrocarbon substituents of the aromatic nucleus, said substituent member having not over 18 carbon atoms; *n* represents an integer selected from the class of zero and 1, and *n′* represents a whole number not greater than 3; and (2) cogenerically associated compounds formed in the preparation of (1) preceding, including monoepoxides; said oxyalkylated phenol-aldehyde resins, reactant (*a*), being the products derived by oxyalkylation of (*aa*) an alpha-beta alkylene oxide having not more than 4 carbon atoms and selected from the class consisting of ethylene oxide, propylene oxide, butylene oxide, glycide and methylglycide, and (*bb*) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward siad phenol; said resin being formed in the substantial absence of trifunctional phenols; said phenol being of the formula

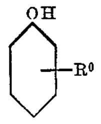

in which $R^0$ is a hydrocarbon radical having not more than 24 carbon atoms and substituted in the 2,4,6 position; said oxyalkylated resin being characterized by the introduction into the resin molecule of a plurality of divalent radicials having the formula $(R_2O)_{n''}$, in which $R_2$ is a member selected from the class consisting of ethylene radicals, propylene radicals, butylene radicals, hydroxypropylene radicals, and hydroxybutylene radicals, and *n″* is a numeral varying from 1 to 120; with the proviso that at least 2 moles of alkylene oxide be introduced for each phenolic nucleus, and that the resin by weight represent at least 2% of the oxyalkylated derivative; the ratio of reactant (*a*) to reactant (B) being in the proportion of four moles of (A) to three moles of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low melting solids; and said reaction between (A) and (B) being conducted below the pyrolytic point of the reactants and the resultants of reaction.

3. A process for breaking petroleum emulsions of the water-in-oil type characterized by subjecting the emulsion to the action of a demulsifier including synthetic hydrophile products; said synthetic hydrophile products being the reaction product of (A) an oxyalkylated phenol- aldehyde resin containing a plurality of active hydrogen atoms, and (B) a member of the class consisting of (1) compounds of the following formula

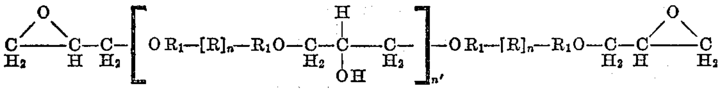

in which R represents a divalent radical selected from the class consisting of ketone residues formed by the elimination of the ketonic oxygen atom and aldehyde residues obtained by the elimination of the aldehydic oxygen atom, the divalent radical

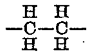

the divalent

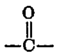

radical, the sulfone radical, and the divalent monosulfide radical —S—, the divalent radical $—CH_2SCH_2—$, and the divalent disulfide radical —S—S—; and $R_1O$ is the divalent radical obtained by the elimination of a hydroxyl hydrogen atom and a nuclear hydrogen atom from the phenol

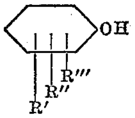

in which R′, R″, and R‴ represent a member of the class consisting of hydrogen and hydrocarbon substituents of the aromatic nucleus, said substituent member having not over 18 carbon atoms; *n* represents an integer selected from the class of zero and 1, and *n′* represents a whole number not greater than 3; and (2) cogenerically associated compounds formed in the preparation of (1) preceding, including monoepoxides; with the proviso that (B) consists principally of the monomer as distinguished from other cogeners; said oxyalkylated phenol-aldehyde resins, reactant (A), being the products derived by oxyalkylation of (*aa*) an alpha-beta alkylene oxide having not more than 4 carbon atoms and selected from the class consisting of ethylene oxide, propylene oxide, butylene oxide, glycide and methylglycide, and (*bb*) an oxyethylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

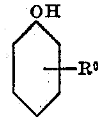

in which $R^0$ is a hydrocarbon radical having not more than 24 carbon atoms and substituted in the 2,4,6 position; said oxyalkylated resin being characterized by the introduction into the resin molecule of a plurality of divalent radicals having the formula $(R_2O)_{n}''$, in which $R_2$ is a member selected from the class consisting of ethylene radicals, propylene radicals, butylene radicals, hydroxypropylene radicals, and hydroxybutylene radicals, and $n''$ is a numeral varying from 1 to 120; with the proviso that at least 2 moles of alkylene oxide be introduced for each phenol nucleus, and that the resin by weight represent at least 2% of the oxyalkylated derivative; the ratio of reactant (A) to reactant (B) being in the proportion of four moles of (A) to three moles of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low melting solids; and said reaction between (A) and (B) being conducted below the pyrolytic point of the reactants and the resultants of reaction.

4. The process of claim 3 wherein the divalent radical R is obtained from a reactant containing carbon, hydrogen and oxygen only.

5. The process of claim 3 wherein the divalent radical R is obtained from a ketone.

6. The process of claim 3 wherein the divalent radical R is obtained from a ketone having not over 8 carbon atoms.

7. The process of claim 3 wherein the divalent radical R is obtained from acetone.

8. The process of claim 3 wherein the divalent radical R is obtained from acetone and the divalent radical $R_1O$ is an unsubstituted phenol radical.

9. The process of claim 3 wherein the divalent radical R is obtained from acetone and the divalent radical $R_1O$ is an unsubstituted phenol radical and the molecular weight of the polyepoxide is not over 1200.

10. The process of claim 3 wherein the divalent radical R is obtained from acetone and the divalent radical $R_1O$ is an unsubstituted phenol radical and the molecular weight of the polyepoxide is at least 350 and not over 800.

11. A process for breaking petroleum emulsions of the water-in-oil type characterized by subjecting the emulsion to the action of a demulsifier including synthetic hydrophile products; said synthetic hydrophile products being the reaction product of (A) an oxyalkylated phenol-aldehyde resin containing a plurality of active hydrogen atoms, and (B) a member of the class consisting of (1) compounds of the following formula

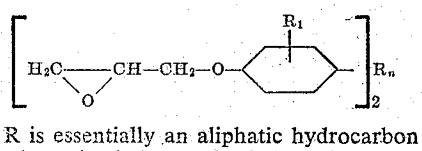

wherein R is essentially an aliphatic hydrocarbon bridge, each $n$ independently has one of the values 0 to 1, and $R_1$ is an alkyl radical containing from 1 to 4 carbon atoms, or even 12 carbon atoms, and (2) cogenerically associated compounds formed in the preparation of (1) preceding, including monoepoxides; with the proviso that (B) consist principally of the monomer as distinguished from other cogeners; said oxyalkylated phenolaldehyde resins being the products derived by oxyalkylation of (*aa*) an alpha-beta alkylene oxide having not more than 4 carbon atoms and selected from the class consisting of ethylene oxide, propylene oxide, butylene oxide, glycide and methylglycide, and (*bb*) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

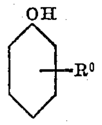

in which $R^0$ is a hydrocarbon radical having not more than 24 carbon atoms and substituted in the 2, 4, 6 position; said oxyalkylated resin being characterized by the introduction into the resin molecule of a plurality of divalent radicals having the formula $(R_2O)_{n}''$, in which $R_2$ is a member selected from the class consisting of ethylene radicals, propylene radicals, butylene radicals, hydroxypropylene radicals, and hydroxybutylene radicals, and $n''$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of four moles of (A) to three moles of (B); with the further proviso that said reactive compounds (A) to (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

12. A process for breaking petroleum emulsions of the water-in-oil type characterized by subjecting the emulsion to the action of a demulsifier including synthetic hydrophile products; said synthetic hydrophile products being the reaction products of (A) an oxyalkylated phenol-aldehyde resin containing a plurality of active hydrogen atoms, and (B) a member of the class consisting of (1) compounds of the following formula:

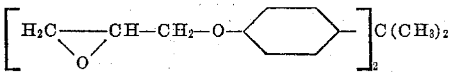

and (2) cogenerically associated compounds formed in the preparation of (1) preceding, including monoepoxides; with the proviso that (B) consist principally of the monomer as distinguished from other cogeners; said oxyalkylated phenolaldehyde resins being the products derived by oxyalkylation of (*aa*) an alpha-beta alkylene oxide having not more than 4 carbon atoms and selected from the class consisting of ethylene oxide, propylene oxide, butylene oxide, glycide and methylglycide, and (*bb*) an oxyalkylation-susceptible fusible, organic solvent-soluble, water-insoluble phenol-aldehyde resin; said resin being derived by reaction between a difunctional monohydric phenol and an aldehyde having not over 8 carbon atoms and reactive toward said phenol said resin being formed in the substantial absence of trifunctional phenols; said phenol being of the formula

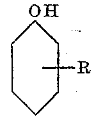

in which R is a hydrocarbon radical having not more than 24 carbon atoms and substituted in the 2, 4, 6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 120; with the proviso that at least 2 moles of alkylene oxide be introduced for each phenolic nucleus, and that the resin by weight represent at least 2% of the oxyalkylated derivative; the ratio of reactant (A) to reactant (B) being in the proportion of four moles of (A) to three moles of (B); with the further proviso that said reactive compounds (A) and (B) be members of the class consisting of non-thermosetting organic solvent-soluble liquids and low-melting solids; with the final proviso that the reaction product be a member of the class of solvent-soluble liquids and low-melting solids; and said reaction between (A) and (B) being conducted below the pyrolytic point of the reactants and the resultants of reaction.

13. The process of claim 1 with the proviso that the hydrophile properties of the polyepoxide derived product in an equal weight of xylene are sufficient to produce an emulsion when said xylene solution is shaken vigorously with 1 to 3 volumes of water.

14. The process of claim 2 with the proviso that the hydrophile properties of the polyepoxide derived product in an equal weight of xylene are sufficient to produce an emulsion when said xylene solution is shaken vigorously with 1 to 3 volumes of water.

15. The process of claim 3 with the proviso that the hydrophile properties of the polyepoxide derived product in an equal weight of xylene are sufficient to produce an emulsion when said xylene solution is shaken vigorously with 1 to 3 volumes of water.

16. The process of claim 4 with the proviso that the hydrophile properties of the polyepoxide derived product in an equal weight of xylene are sufficient to produce an emulsion when said xylene solution is shaken vigorously with 1 to 3 volumes of water.

17. The process of claim 5 with the proviso that the hydrophile properties of the polyepoxide derived product in an equal weight of xylene are sufficient to produce an emulsion when said xylene solution is shaken vigorously with 1 to 3 volumes of water.

18. The process of claim 6 with the proviso that the hydrophile properties of the polyepoxide derived product in an equal weight of xylene are sufficient to produce an emulsion when said xylene solution is shaken vigorously with 1 to 3 volumes of water.

19. The process of claim 7 with the proviso that the hydrophile properties of the polyepoxide derived product in an equal weight of xylene are sufficient to produce an emulsion when said xylene solution is shaken vigorously with 1 to 3 volumes of water.

20. The process of claim 8 with the proviso that the hydrophile properties of the polyepoxide derived product in an equal weight of xylene are sufficient to produce an emulsion when said xylene solution is shaken vigorously with 1 to 3 volumes of water.

21. The process of claim 9 with the proviso that the hydrophile properties of the polyepoxide derived product in an equal weight of xylene are sufficient to produce an emulsion when said xylene solution is shaken vigorously with 1 to 3 volumes of water.

22. The process of claim 10 with the proviso that the hydrophile properties of the polyepoxide derived product in an equal weight of xylene are sufficient to produce an emulsion when said xylene solution is shaken vigorously with 1 to 3 volumes of water.

23. The process of claim 11 with the proviso that the hydrophile properties of the polyepoxide derived product in an equal weight of xylene are sufficient to produce an emulsion when said xylene solution is shaken vigorously with 1 to 3 volumes of water.

24. The process of claim 12 with the proviso that the hydrophile properties of the polyepoxide derived product in an equal weight of xylene are sufficient to produce an emulsion when said xylene solution is shaken vigorously with 1 to 3 volumes of water.

References Cited in the file of this patent

UNITED STATES PATENTS

| | | |
|---|---|---|
| 2,454,541 | Bock et al. | Nov. 23, 1948 |
| 2,454,545 | Bock et al. | Nov. 23, 1948 |
| 2,499,365 | De Groote et al. | Mar. 7, 1950 |
| 2,507,910 | Keiser et al. | May 16, 1950 |
| 2,558,688 | Landa | June 26, 1951 |
| 2,602,052 | De Groote | July 1, 1952 |
| 2,615,853 | Kirkpatrick et al. | Oct. 28, 1952 |